United States Patent [19]

Earnshaw

[11] 4,055,030
[45] Oct. 25, 1977

[54] GREENHOUSE

[75] Inventor: William Ferguson Earnshaw, Regina, Canada

[73] Assignee: Earnshaw Enterprises Ltd., Regina, Canada

[21] Appl. No.: 680,019

[22] Filed: Apr. 26, 1976

[30] Foreign Application Priority Data

Apr. 29, 1975 Canada .................................. 226003

[51] Int. Cl.² ........................... E04B 1/32; E04B 1/00
[52] U.S. Cl. .......................................... 52/86; 52/63; 52/222; 135/1 R
[58] Field of Search ..................... 52/86, 63, 247, 222; 47/17, 29; 135/1 R, 3 R

[56] References Cited

U.S. PATENT DOCUMENTS

| 2,328,197 | 8/1943 | Cowin | 52/86 |
| 2,717,060 | 9/1955 | Collins | 52/86 |
| 2,816,329 | 12/1957 | Sogaro | 52/86 |
| 2,827,138 | 3/1958 | Roy, Jr. | 52/63 |
| 3,057,119 | 10/1962 | Kessler | 52/63 |
| 3,346,991 | 10/1967 | Leskinen | 52/86 |
| 3,483,879 | 12/1969 | Oehmsen | 52/86 |

Primary Examiner—Price C. Faw, Jr.
Assistant Examiner—Robert C. Farber
Attorney, Agent, or Firm—Rogers, Bereskin & Parr

[57] ABSTRACT

The disclosure concerns a greenhouse which defines an enclosed growing area covered by a structure including an external framework of convex shape in transverse cross-section, and a plurality of flexible light-transmitting panels arranged to form a covering at the inner side of the framework. The frame work includes a plurality of curved members extending transversely of the structure in parallel longitudinally spaced positions and forming rafters of the structure, and a plurality of parallel elongate members extending longitudinally of the structure and attached to the rafters. The light transmitting panels are each snap-fitted between adjacent ones of said longitudinal members of the framework in an outwardly bowed configuration.

6 Claims, 4 Drawing Figures

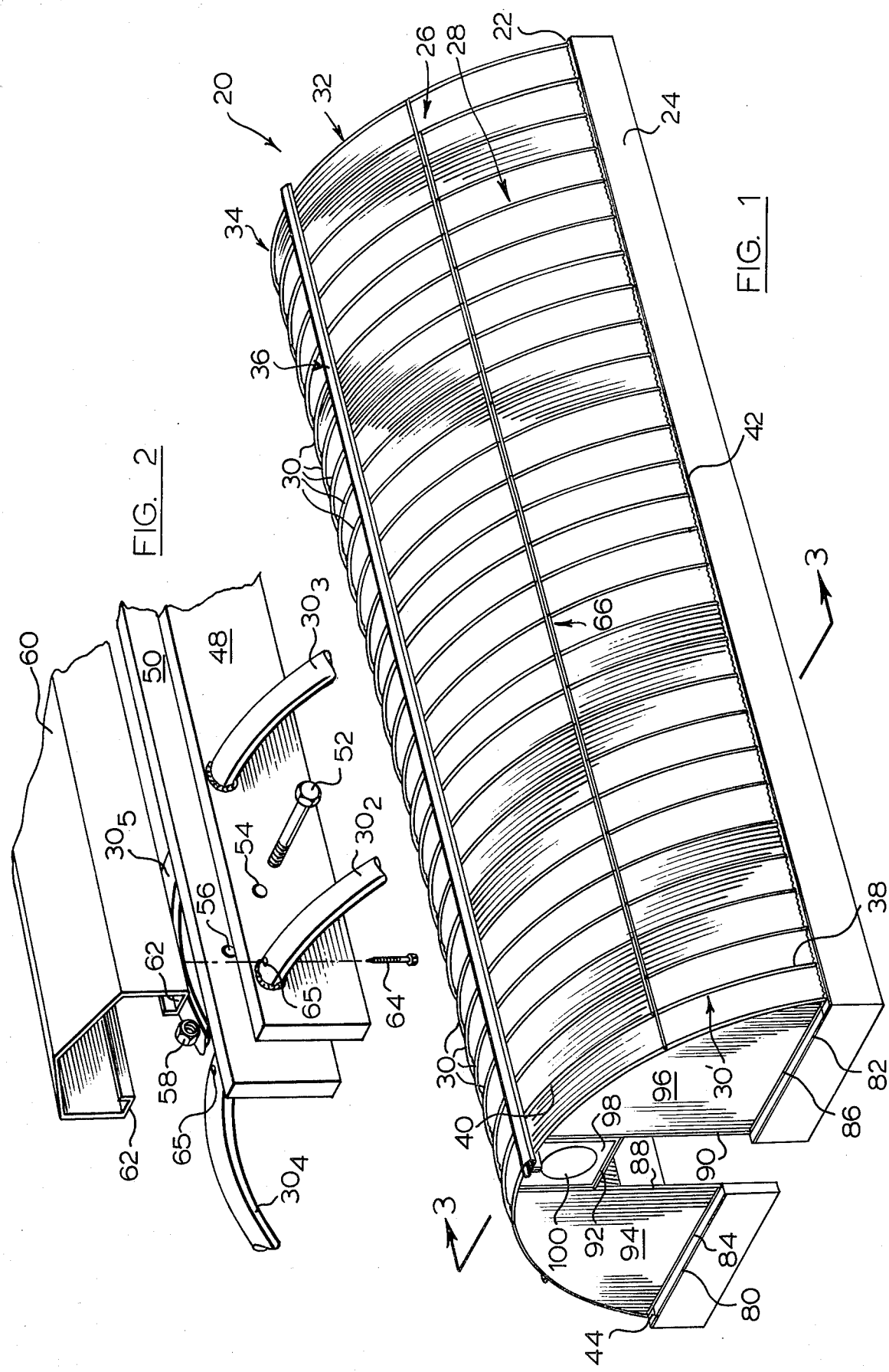

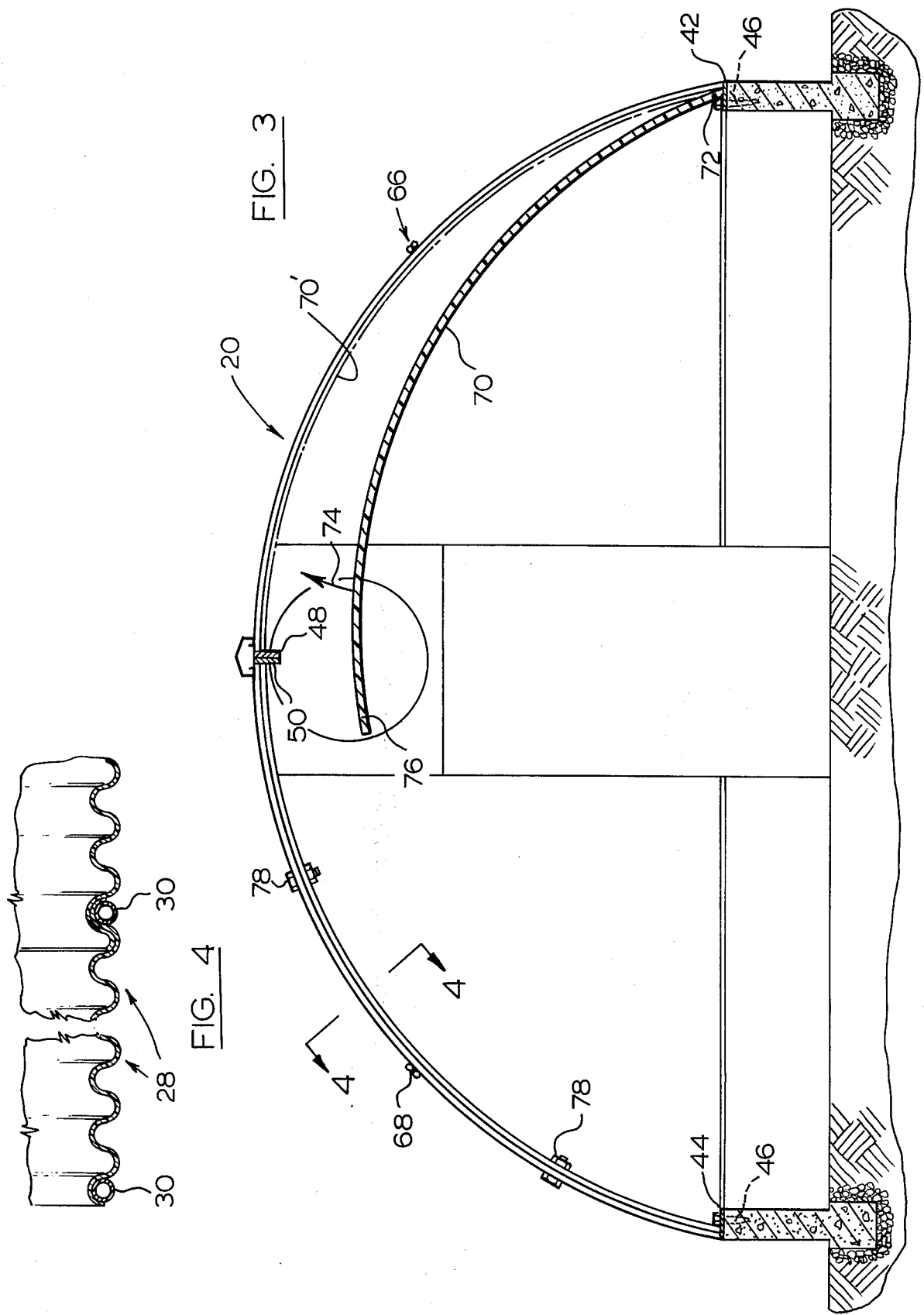

GREENHOUSE

This invention relates to greenhouses and has for its object to provide a greenhouse which is of simplified construction compared with conventional greenhouses.

The greenhouse according to the invention defines an enclosed growing area covered by a structure which includes an external framework of convex shape in transverse cross-section, and a plurality of flexible light-transmitting panels arranged to form a covering at the inner side of the framework. The framework includes a plurality of curved members extending transversely of the structure in parallel longitudinally spaced positions and forming rafters of the structure, and a plurality of parallel elongate members extending longitudinally of the structure and attached to the rafters. The light transmitting panels are each snap-fitted between adjacent ones of said longitudinal members of the framework in an outwardly bowed configuration.

A preferred embodiment of the invention will now be described by way of example with reference to the accompanying drawings, in which:

FIG. 1 is a perspective view from one end and above of a greenhouse according to the invention;

FIG. 2 is an exploded perspective view of part of FIG. 1;

FIG. 3 is a transverse cross-sectional view on line 3—3 of FIG. 1; and,

FIG. 4 is a partial cross-sectional view on line 4—4 of FIG. 3.

Referring first to FIGS. 1 and 3, the greenhouse defines an enclosed growing space covered by a structure generally denoted 20 supported on the upper surface 22 of a peripheral concrete wall 24. As can be seen from FIG. 3, the lower margin of the wall 24 is located below ground and forms a foundation for the greenhouse. The structure 20 is of convex shape in transverse vertical cross-section and includes an external framework generally designated 26 to the inner side of which are secured a plurality of flexible fiberglass panels generally indicated at 28.

Framework 26 includes a plurality of curved tubular rafters 30 which extend transversely of the framework in parallel, longitudinal positions. The rafters are arranged in two series 32, 34 extending along respectively opposite sides of the framework, the inner ends of the rafters in the respective series meeting at a central ridge 36 of the framework. Accordingly, each rafter is positioned with its outer end adjacent the upper face 22 of the wall 24 with its inner end adjacent the ridge 36 of the framework. Referring by way of example to one of the rafters denoted 30' in the series 32, the outer end 38 of this rafter is disposed adjacent the upper face 22 of wall 24 and the inner end 40 of the rafter is disposed adjacent the ridge 36 of the framework.

The framework also includes two elongate base plates 42, 44 which extend longitudinally of the framework along the upper face 22 of the wall 24 at opposite sides of the structure. The outer ends of the rafters 30 in series 32 are welded to plate 42 and the outer ends of the rafters in series 34 are welded to plate 44. Each of the plates 42, 44 is secured to the wall 24 by anchor bolts 46 (FIG. 3) passing through the relevant plate and embedded in the wall. The inner ends of rafters in the respective series are welded to similar plates 48, 50 (see particularly FIG. 2) which are bolted together in face-to-face relationship along the central ridge 36 of the framework. As can be seen from FIG. 2, each of the plates 48, 50 is of narrow rectangular shape in cross-section and the plates are secured together by nuts and bolts. One of these bolts is indicated at 52 in FIG. 2 and passes through aligned holes 54, 56 in the respective plates 48 and 50. A nut indicated at 58 is fitted to the other end of the bolt. The inner end portions of two of the rafters in series 32 are visible at $30_2$ and at $30_3$ and the inner end portions of two of the rafters in series 34 are visible at $30_4$ and $30_5$. A capping strip 60 of the cross-sectional shape shown in FIG. 2 is fitted over the joint between the opposed faces of the plates 48 and 50. The purpose of strip 60 is to prevent water leaking into the greenhouse between the opposed faces of the plates 48 and 50. As can be seen, strip 60 is formed along opposite longitudinal margins with a pair of inwardly directed channels 62, the bases of which bear on the inner end portions of the rafters 30 where they join the plates 48 and 50. The strip 60 is attached to the rafters by self-tapping screws inserted through vertical holes drilled in selected ones of said rafters and screwed into the bases of the channel 62. One such screw is indicated at 64 in FIG. 2 and is intended to be inserted through a hole 65 in rafter $30_2$ and to be secured into the base of the channel 62 shown at the right hand side of the cap 60.

The framework also includes a series of longitudinally extending bracing members generally indicated at 66 and 68 (see FIGS. 1 and 4) associated with the respective series 32, 34 or rafters 30. Each of said bracing members is of a length equal to twice the spacing between adjacent rafters 30 and is welded at its end to alternate rafters. For example, referring to the bracing member 66, the member 66 at the left hand end of the framework in FIG. 1 is welded at one end to the first rafter 30 in the series 32 and at its opposite end to the third rafter. The next bracing member 66 is arranged parallel to and adjacent the first member and is welded at one end to the second rafter 30 in the series and at its opposite end to the fourth rafter. The bracing members 68 at the other side of the framework in FIG. 1 are arranged in similar fashion. As has already been mentioned, the fiberglass panels 28 are arranged at the inner side of the framework 26. Each panel is of rectangular shape and the panels are arranged in two series, one associated with each series of rafters. The panels in each series are arranged side by side with adjacent margins overlapping. The panels are corrugated and the rafters 30 are arranged at a spacing to correspond with the pitch of the corrugations in the panels.

In FIG. 3 one of the panels is indicated at 70 in position prior to being fitted on the framework. The panel is positioned laterally with respect to the relevant rafters 30 and its lower end 72 is placed on the upper surface of the base plate 42. The opposite end of the panel is then lifted in the direction of arrow 74 in FIG. 3 until the inner end 76 of the panel snaps into place adjacent the outer face of plate 48. Panel 70 is then located in the chain line position indicated at 70'. If necessary the plates 48 and 50 may be wedged apart along their adjacent lower edges in order to improve retention of the inner ends of the panels. The panels are bolted to the framework as indicated by the nuts and bolts denoted 78 in FIG. 3. The bolts are inserted through holes drilled through the rafters 30 and the panels 26 after the panels have been snap-fitted in position as described above. FIG. 4 shows two of the panels in position and illustrates how they overlap.

Opposite ends of the greenhouse are closed in similar fashion. Referring to the end which is visible in FIG. 1, base plates 80 and 82 are anchored to the upper face 22 of the portions of the wall 24 at the end of the greenhouse. A horizontal tubular member 84, 86 is welded along each of the plates 80, 82 respectively and vertical tubular members 88 and 90 respectively are erected from the inner ends of the members 84 and 86 and are welded at their upper ends to the end rafters in the series 32, 34. A cross-member 92 is welded between the vertical members 88 and 90. Fiberglass panels of appropriate shape denoted at 94, 96 and 98 are then bolted to the insides of the members 84 to 92. Member 90 serves as a pillar for supporting a door (not shown). The fiberglass panel 98 is provided with a circular cutout 100 for ventilation purposes.

The greenhouse described above provides a number of advantages compared with conventional greenhouses. The fiberglass panels used in the greenhouse allow infrared radiation to enter the greenhouse, which is beneficial to plants. The generally curved configuration of the greenhouse provides greater strength than a flat-roofed greenhouse with less risk of breakage of the panels. Further, it is believed that the amount of light which is reflected from the flat roof of a conventional greenhouse may be considerably greater than the amount of light reflected from a curved surface as in the greenhouse described above. Further, the greenhouse is cheaper to construct and is more easily constructed than conventional greenhouses.

The preceding description applies to a specific embodiment of the invention only and it is of course to be understood that many variations are possible within the broad scope of the invention. For example, the concrete wall 24 described above may be omitted and the structure supported on the ground or on a smaller foundation. On the other hand, in some situations, it may be desirable to use the convex structure of the invention to form the roof only of a greenhouse. In this case, a wall equivalent to the concrete wall 24 referred to above would be provided but would be of extended height. Such a wall need not of course be concrete and could include transparent panels.

In the specific embodiment described, the convex structure of the greenhouse is generally of semi-circular shape in transverse cross-section. It is, however, to be understood that other generally convex shapes may be employed. Further, it is not essential to use two series of panels meeting at the central ridge of the convex structure. For example, a single series of panels may be used in which each panel extends from one side of the structure to the other.

The panels at the inner side of the framework of the greenhouse need not be made of fiberglass within the broad scope of the invention. For example, plain PLEXIGLASS (Trade Mark) panels could be used. Further, by virtue of the fact that the panels are snap-fitted to the inside of the framework, it is not essential that they be attached to the framework as by the nuts and bolts 78 described in this specific embodiment. In certain applications, it may be sufficient if the panels are simply snap-fitted into place.

Other detail changes are of course possible in terms of, for example, the shape and sizes of the parts used. In the specific embodiment described, the rafters are made of steel tube of circular shape in cross-section althrough it is of course to be understood that there is no limitation in this.

What I claim is:

1. A greenhouse which defines an enclosed growing area and which includes a structure covering said area, the structure comprising:

an external framework of convex shape in transverse vertical cross-section, the framework including: a plurality of curved members extending transversely of the structure in parallel longitudinally spaced positions and forming rafters of the structure, said rafters being arranged in two series extending along opposite sides of the structure and meeting at a longitudinal ridge area of the structure; a plurality of parallel elongate members extending longitudinally of the structure, the inner ends of the rafters in each of said series being coupled to one of said elongate members at said ridge area of the structure, and the outer ends of the rafters in each series being coupled to a further one of said elongate members at an outer side of the structure; and a capping element disposed at said ridge area of the structure and arranged to prevent ingress of moisture between the elongate members in said area; and, a plurality of flexible light-transmitting panels arranged to form a covering inside the framework, said elongate members at the inner and outer ends of the rafters of each series defining opposed locating surfaces for respectively opposite ends of said panels, and each panel being fitted to the framework in a tensioned condition in which the panel bears against the inner sides of at least some of said rafters in the relevant one of said series, with its ends braced against the locating surfaces of said elongate members.

2. A method of constructing a greenhouse which defines an enclosed growing area and which includes a structure covering said area, the method comprising the steps of:

erecting an external framework of convex shape in transverse vertical cross-section, the framework including: a plurality of curved members extending transversely of the structure in parallel longitudinally spaced positions and forming rafters of the structure, said rafters being arranged in two series extending along opposite sides of the structure and meeting at a longitudinal ridge area of the structure; a plurality of parallel elongate members extending longitudinally of the structure, the inner ends of the rafters in each of said series being coupled to one of said elongate members at said ridge area of the structure, and the outer ends of the rafters in each series being coupled to a further one of said elongate members at an outer side of the structure, each said elongate member defining a locating surface disposed inwardly of said rafters; and a capping element disposed at said ridge area of the structure and arranged to prevent ingress of moisture between the elongate members in said area; and, fitting between the elongate members at the inner and outer ends of each of said series of rafters, at least one flexible light-transmitting panel, each panel being disposed in a tensioned condition against the inner sides of the rafters in said series with its ends braced against said locating surfaces of the elongate elements associated with the rafters of said series.

3. A greenhouse as claimed in claim 1, further comprising a foundation wall of rectangular shape in plan extending around the said enclosed growing area of the greenhouse, wherein said two elongate members at the outer ends of the rafters in said series extend along the upper surfaces of and are secured to longitudinal portions of the said wall.

4. A greenhouse as claimed in claim 1, wherein the said flexible light-transmitting panels, in addition to being snap-fitted between adjacent ones of said elongate members are bolted to the rafters.

5. A greenhouse as claimed in claim 1, wherein the said panels are corrugated and are made of fiberglass, and wherein the said corrugations extend parallel to the rafters, the rafters being spaced to correspond with the pitch of the corrugations in the panels, whereby the panels can be fitted to the said framework with the rafters fitted into relevant ones of said corrugations.

6. A greenhouse as claimed in claim 1, wherein the rafters are connected together by external bracing members which extend longitudinally of the structure parallel to said elongate members and are coupled to the rafters externally of the structure.

* * * * *